United States Patent
D'Acremont et al.

[15] 3,636,869
[45] Jan. 25, 1972

[54] FODDER BALER FEED MECHANISM

[72] Inventors: Alain F. D'Acremont, Morey St. Denis; Gerard Chaumont, Dijon; Alain P. Lefeuvre, Perrigny-les-Dijon, all of France

[73] Assignee: Sperry Rand France S.A., Puteaux, France

[22] Filed: July 10, 1970

[21] Appl. No.: 55,300

[52] U.S. Cl. .................................. 100/189, 100/142, 56/341
[51] Int. Cl. .................................................. B30b 1/00
[58] Field of Search .................. 100/142, 188, 189; 198/223; 56/341, 343

[56] References Cited

UNITED STATES PATENTS

| | | | |
|---|---|---|---|
| 2,572,180 | 10/1951 | Morrison | 100/189 |
| 3,030,877 | 4/1962 | McDuffie et al. | 100/142 |
| 3,517,609 | 6/1970 | Smith et al. | 100/189 |

Primary Examiner—Peter Feldman
Attorney—Joseph A. Brown, John C. Thompson, James J. Kennedy and George C. Bower

[57] ABSTRACT

This feed mechanism for fodder baler wherein the relative rates of motion of the moving component elements are of differential nature and same direction to permit a high rate of operation without reaching abnormally high speeds in the guide members, is characterized in that it comprises a device driving the guide member of the finger-supporting bar in order to impress a circular movement of translation thereto, wherein the guide member remains constantly parallel to itself and each one of its points describes a circle by performing a complete revolution at each cycle of the feed mechanism, that is, for each reciprocation of the baling piston, this mechanism being applicable not only to fodder baler but also to any machines designed for treating fiber materials.

7 Claims, 5 Drawing Figures

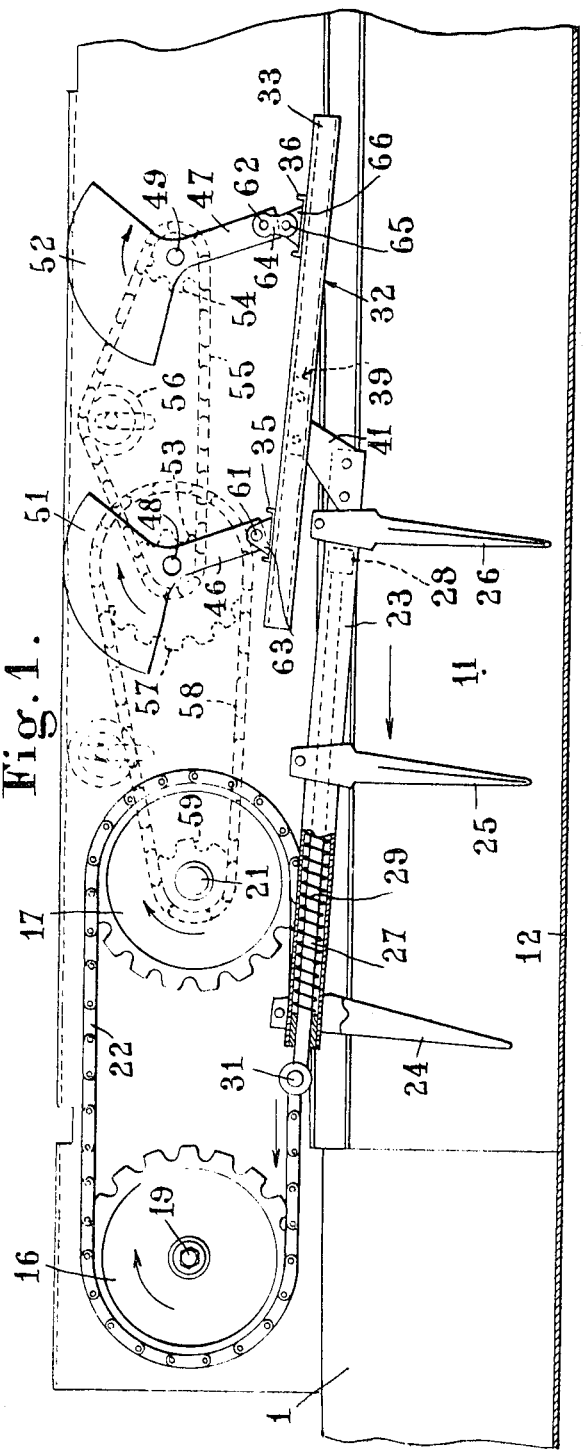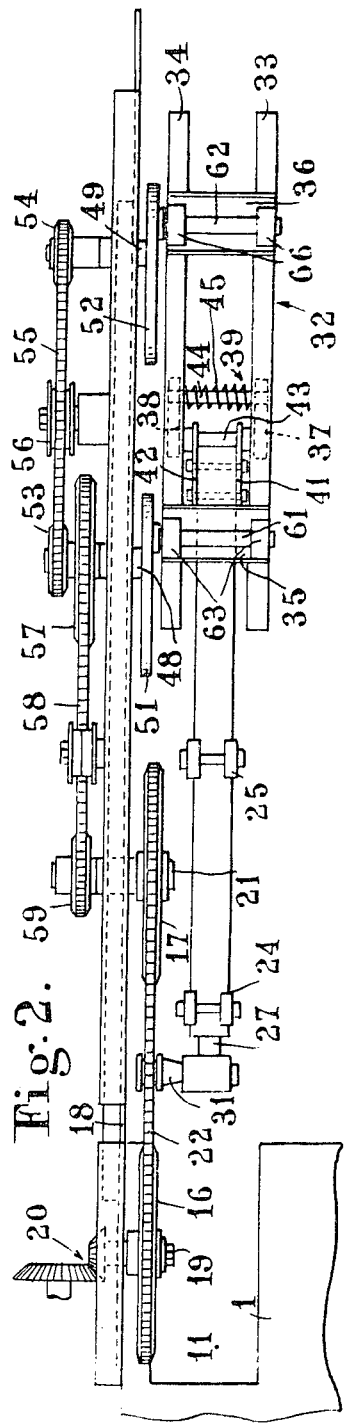

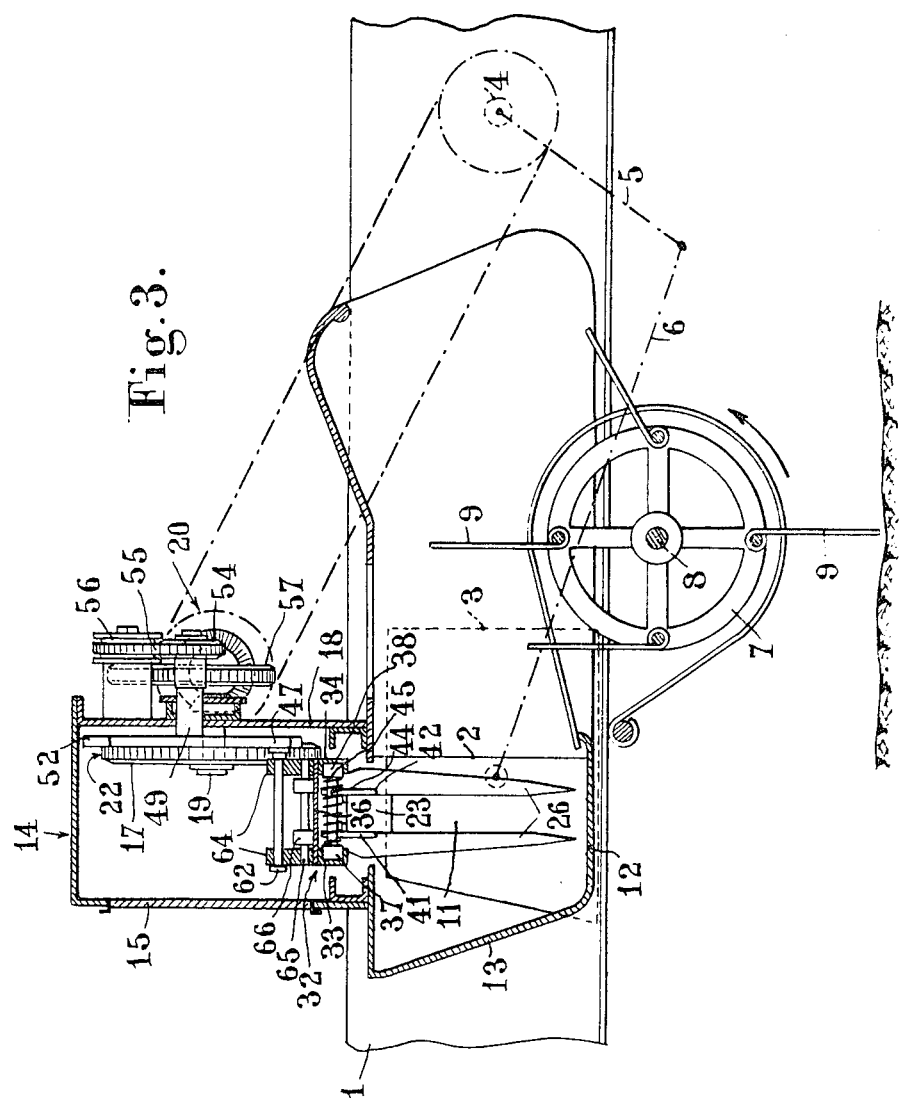

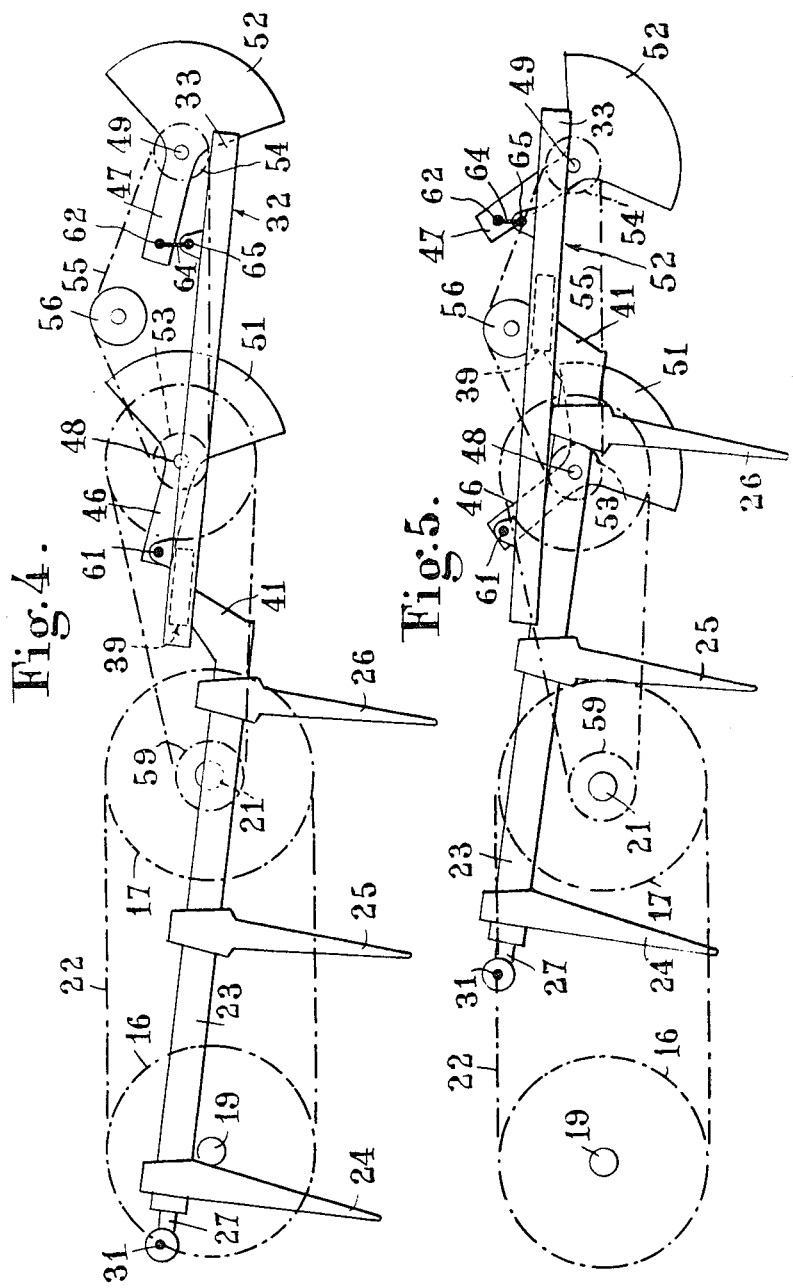

FODDER BALER FEED MECHANISM

The present invention relates to a feed device for fodder press or baler, or any press treating a fiber material of any type.

Automatic fodder balers are already known which are supported by wheels and pulled by a tractor across a field covered with harvested and swathed fodder, hay or grass. These balers comprise a mechanism for picking up the fodder laying on the ground and for directing same into a feed chamber extending at right angles to a baling chamber in which a piston is reciprocated. The fodder is carried from the feed chamber to the baling chamber by a feed mechanism driven in synchronism with said piston.

A known feed mechanism for fodder presses or balers comprises a bar carrying spaced depending fingers, said bar being driven at one end by an endless chain passing over a pair of sprockets of which one is driven in synchronism with the mechanism controlling the piston motion. The other end of said bar is guided by a device supported by the frame structure of the machine. The guided end of the finger supporting bar will thus perform a reciprocating motion in said guide means and in fact the rate of operation of the feed mechanism is rather limited.

It is the essential object of the present invention to avoid this inconvenience by providing a feed mechanism of particularly simple design wherein the rate of operation can be increased to a substantial degree.

To this end the fodder baler feed mechanism comprising, in a feed chamber extending at right angles to a baling chamber in which a piston is reciprocated, an endless chain passing over a pair of sprockets one of which is driven in synchronism with said piston, and a bar carrying depending fingers, said bar having one end coupled to said endless chain and the other end slidably engaged in a guide member, is characterized in that it comprises a device causing said finger-supporting bar to be guided along a circular path in which the guide member remains constantly parallel to itself and each point thereof describes a circle, by performing a complete revolution during each feed cycle, i.e., during each reciprocation of said piston.

According to a complementary feature characterizing this invention, said guide member is operatively connected to a pair of parallel rotary arms of same length, at points separated by a distance equal to the interval between the two axes of rotation of said arms. These arms are rotatably driven while remaining parallel to each other by means of a transmission device adapted to couple said arms for example to one of the sprockets of said mechanism.

As a continuous motion is impressed to the finger-supporting bar and to the bar guide member, i.e., without reversing the direction of motion, the rates of operation obtainable with this arrangement are considerably higher than the maximum rates obtained with hitherto known feed mechanisms. Thus, for instance, rates as high as 100 to 120 piston strokes per minute, sustained during long periods of operation, have been obtained with the mechanism of this invention, which compares favorably with a maximum rate of the order of 60 to 80 piston strokes per minute obtained with feed mechanisms of the conventional type mentioned hereinabove. This increment, corresponding to about 40 percent, of the rate of operation, is attended of course by a higher efficiency of the feed mechanism.

The increment in the rate of operation is also attended by other advantageous features, such as the more regular feeding of the machine, with a smoother operation and a faster and smoother instantaneous effort.

A typical form of embodiment of the mechanism constituting the subject-matter of this invention will now be described by way of example with reference to the attached drawing, in which:

FIG. 1 is a fragmentary vertical cross-sectional view of a fodder baler or press, showing the feed mechanism in the position obtaining when the finger-supporting bar is halfway of its lower horizontal stroke;

FIG. 2 is a fragmentary plane view of the feed mechanism;

FIG. 3 is a simplified vertical and longitudinal view; and

FIGS. 4 and 5 are diagrammatic elevational views showing various positions of the feed mechanism during a complete cycle of operation.

Referring firstly to FIGS. 1 to 3 of the drawing, there is illustrated in fragmentary and diagrammatic view therein a fodder or hay press or baler of the type described in detail in the French Pat. No. 1,171,405. This baler comprises a longitudinal baling chamber 1 provided in one of its lateral vertical walls with a feed opening 2. A piston 3 is mounted for longitudinal sliding reciprocation in said chamber 1 so as to move past the opening 2. This piston 3 is driven from a rotary shaft 4 through any suitable means shown in diagrammatic form as consisting of a crank arm 5 and a connecting rod 6 in FIG. 3. The rotary shaft 4 is rotatably driven in turn from a power pickup of the tractor pulling the fodder baler.

The function of piston 3 consists in compressing the fodder fed into chamber 1 and to successively push the bales, as they are formed, into the rear portion of said chamber.

This fodder press further comprises a fodder pickup device comessentially a drum 7 rigid with a shaft 8 rotatably driven from shaft 4 through a suitable mechanism (not shown). This drum 7 carries on its outer periphery a plurality of blades or fingers 9 adapted to engage the fodder laying on the ground so as to pick up this fodder and direct it towards a feed chamber 11 disposed behind and above the drum 7. This feed chamber 11 communicates with the baling chamber 1 via said opening 2 and extends in a transverse direction. It is bounded by a lower horizontal bottom 12 having a rear wall extension 13 and overlying it is a transverse casing 14 closed at its rear end by a detachable plate 15. This casing 14 enclosed the feed mechanism of this invention which designed for transferring the fodder from feed chamber 11 to baling chamber 1.

This feed mechanism comprises a pair of sprocket wheels 16 and 17 rigid with corresponding horizontal shafts 19 and 21 trunnioned in the front wall 18 of casing 14. Sprocket 16 is rotatably driven from the power shaft via a transmission mechanism designated generally by the reference numeral 20.

An endless chain 22 having attached to one of its links a tubular bar 23 passes over sprockets 16 and 17. This bar 23 carries substantially vertical depending fingers having the function of transferring the fodder from the feed chamber 11 to the baling chamber 1. This bar 23 carries for example three pairs of fingers 24, 25 and 26 rigidly secured thereto. The front fingers 24 are secured to the end of bar 23 which is adjacent to the baling chamber 1, and the pair of fingers 26 are attached to the opposite or rear end of the bar; finally, fingers 25 are secured to the bar 23 at a substantially intermediate or central position thereof. The bar 23 is coupled to chain 22 via a telescopic coupling comprising essentially a rod 27 housed within the tubular bar 23 and carrying a guide block 28 at its inner end. A compression spring 29 is disposed between the end of bar 23 and said guide block 28. The rod 27 is coupled at its outer end to one link of chain 22 by means of a device 31 permitting an angular backlash of this rod in relation to said link.

The movement of the rear end of bar 23 is controlled by a movable guide member 32 consisting of a pair of parallel channel sections 33, 34 interconnected by upper distance-pieces 35, 36. The channel sections 33 and 34 are slidably engaged by shoes 37 and 38 forming part of a slide 39 rigidly connected to the rear end of bar 23 by means of a pair of lugs 41 and 42. The shoes 37 and 38 are fulcrumed to a transverse shaft 43 extending through said lugs 41 and 42, and are also interconnected by means of a pin 44 extending through a coil compression spring 45 urging the shoes 37 and 38 against the bottoms of sections 33 and 34.

With this arrangement, the rear end of bar 23 is guided during the movement of this bar by the slide 39 moving in said sections 34 and 33.

The guide member 32 is adapted to move along the upper wall 18 of casing 14. To this end, it is coupled to a pair of parallel rotary arms 46 and 47 having their relevant pivot pins 48 and 49 trunnioned on said wall 18. These arms 46 and 47, on their sides opposite to their pivot pins 48 and 49, are rigid with balance weights 51 and 52, respectively. The pins 48 and 49 are rigid, on the other side of wall 18; with corresponding sprockets 53 and 54 engaged by an endless chain 55 tensioned by an adjustable pinion 56. Besides, the pin 48 is also rigid with a sprocket wheel 57 coupled via another chain 58 to a sprocket pinion 59 rigid with the shaft 21 of sprocket 17.

The transmission ratio between sprocket pinion 59 and sprocket wheel 57 is such that a complete revolution of chain 22 corresponds to a complete revolution of arms 46 and 47.

These arms 46 and 47 are coupled to the guide member 22 via overhanging pins 61 and 62, respectively, which extends towards the rear of the machine from the ends of said arms. The pin 61 is trunnioned in bearings 63 adjustably mounted in distance-piece 35. On the other hand, pin 62 is connected by means of a pair of links 64 to a transverse pin 65 trunnioned in bearings 66 carried by the other distance-piece 36 (FIG. 3).

Now the operation of the feed mechanism of this invention will be described with particular reference to FIGS. 1, 4 and 5 of the drawing. In the initial position of the mechanism, which is illustrated in FIG. 1, it will be seen that the bar 23 supporting the pairs of fingers 24, 25, and 26 is in its lowermost position, nearly at midstroke (in the leftward direction, as seen in the FIGS.), i.e., towards the baling chamber 1. The bar 23 is slightly inclined downwards and to the right, whereby the rear fingers 26 are positioned at a level slightly lower than that of front fingers 24. During the movement of these fingers 24, 25, and 26 to the left, i.e., towards the baling chamber 1, they carry along the fodder lying in feed chamber 11 and transfer same to chamber 1 where this fodder is then compressed by the piston 3 each time the latter is driven towards the rear of the machine.

In the position illustrated in FIG. 1 the guide member 32 is also in its lowermost position and slightly inclined downwards and to the right. The slide 39 to which the rear end of bar 23 is operatively connected is located slightly beyond the middle of guide member 32, to the left as seen in FIG. 1.

As the rotation of sprockets 16, 17 and arms 46, 47 continues in the direction shown in the drawing the bar 23 keeps moving to the left while remaining substantially in the position shown in FIG. 1, the front fingers 24 penetrating into the baling chamber 1. Besides, the slide 39 moves towards the left-hand end of guide member 32 to which a circular movement of translation is impressed by the arms 46 and 47 which remain parallel to itself.

After the chain link 22 to which the device 31 is coupled has engaged the sprocket 16, this link 22 begins to be carried along in an upwardly direction by this sprocket and at a given point of this rotation the bar 23 lies in the position illustrated in FIG. 4. In this case, the device 31 has performed an angular movement of about 120° about the shaft 19, from its lower-most position, and the front fingers 24 are removed from the baling chamber 1 through the greater part of their length. The bar 23 is more inclined to the horizontal due to the upward movement of device 31. Besides, the slide 39 is at the left-hand end of guide member 32 which has been somewhat raised, while remaining parallel to itself, by the rotary arms 46 and 47.

As the movement of rotation continues, the bar 23 and guide member 32 move to the positions shown in FIG. 5. In this case the chain link to which the device 31 is attached lies nearly in the middle of the upper reach of the endless chain 22, and bar 23 is in its upper position with the slide 39 substantially intermediate the ends of guide member 32 also in its upper position. Bar 23 and guide member 32 are constantly slightly inclined downwards and to the right, as seen in the drawing.

Then, the bar 23 and guide member 32 begin to resume their downward movement, and the chain link 22 to which the device 31 is attached is lowered by the sprocket 17. During this movement, slide 39 attains the endmost position to the right hand end of guide member 32, the latter moving downwards while remaining constantly parallel to itself.

As the movement continues, the bar 23 and guide member 32 are restored to their initial position illustrated in FIG. 1.

From the foregoing it will be seen that all the moving parts of the mechanism perform continuous movement of rotation, so that particularly high rates of operation can be achieved.

The finger-supporting bar 23 can be moved either while remaining strictly parallel to itself or, as already suggested hereinabove, it can be shifted angularly in the downward and front-to-rear direction, during its upward movement, to take due account of the necessary clearance and prevent it notably from striking the movable guide member 32.

The telescopic device for coupling the bar 23 to the chain 22 permits of preventing any faulty operation in case of fodder cramming. Should this cramming occur, the bar 23 can have its forward movement limited without inasmuch interferring with the movements of the other component elements of the mechanism and therefore without causing any damage thereto. As the movement of chain 22 continues it then causes the rod 27 to slide outwardly in relation to bar 23 held against motion, so as to compress the spring 29 by means of guide block 28. Besides, the movement of translation of guide member 32 can still continue since the channel sections 33 and 34 can slide on the member 39 locked against motion.

Immediately as the fodder cramming is removed, the spring 29 can act upon the guide block 28 to urge the rod 27 back into the tubular bar 23, so that this bar 23 can resume its movement.

The function of links 64 is not only to interconnect the pair of parallel pins 62 and 65 but also to avoid stiff points and take due account of variations in the longitudinal dimensions.

Of course, various modifications and variations may be brought to the specific form of embodiment of the present invention which is shown and described herein, without departing from the spirit and scope of the invention as set forth in the appended claims. Thus, notably, this invention is also applicable to other machines, notably of the type designed for treating other fiber materials.

What is claimed is:

1. A feed mechanism for a baler which comprises a feed chamber extending at right angles to a baling chamber in which a piston is positively reciprocated, an endless chain passing over a pair of sprockets of which one is driven in synchronism with said piston, and a bar supporting a plurality of downwardly extending fingers, said bar having one end coupled to said endless chain and the other end slidably engaged in a guide member, characterized in that said guide member comprises a device adapted to impress to the guide member of said finger-supporting bar a circular movement of translation in which said guide member remains constantly parallel to itself and each point thereof describes a circular path while performing a complete revolution during each complete cycle of the feed mechanism.

2. A mechanism according to claim 1, characterized in that said guide member is operatively connected to a pair of rotary parallel arms at points separated by a distance equal to the interval measured between the two axis of rotation of said arms, said arms being coupled via an intermediate transmission mechanism to the mechanism driving said endless chain so as to perform a complete revolution at each revolution of, and in the same direction as, said chain.

3. A mechanism according to claim 2, characterized in that said pair of arms are rigid with separate pivot pins trunnioned in a wall of the casing enclosing said mechanism and rigid with other sprockets connected by a transmission chain, one of said pivot pins being coupled to the shaft of one of said sprockets engaged by said first-named endless chain.

4. A mechanism according to to claim 1 characterized in that said finger-supporting bar is pivotally mounted on a movable sliding in turn in said guide member.

5. A mechanism according to claim 4, characterized in that said guide member consists of a pair of parallel and registering channel sections and that said slide comprises a pair of shoes slidably engaging said channel sections respectively, said shoes being resiliently urged against the bottom of said sections and interconnected by a pin extending through a bearing-forming support secured to the end of said finger-supporting bar.

6. A mechanism according to claim 2, characterized in that the two arms are rigid with parallel overhanging pins one of which is mounted in fixed bearing rigid with said guide member, the other overhanging pin being pivoted via a pair of links to another pin trunnioned in another pair of bearings secured to said guide member.

7. A mechanism according to claim 1, characterized in that said finger-supporting bar is of tubular configuration and connected to said endless chain by means of a telescopic device comprising a rod slidably housed in said finger-supporting bar, and having its outer end coupled to one link of said endless chain, the inner end of said rod carrying a guide block, and the mechanism further includes a compression spring disposed between said guide block and the closed end of said tubular bar.

* * * * *